P. C. GUIOU.
Draft Accelerator.
No. 465.
Reissued May 26, 1857.
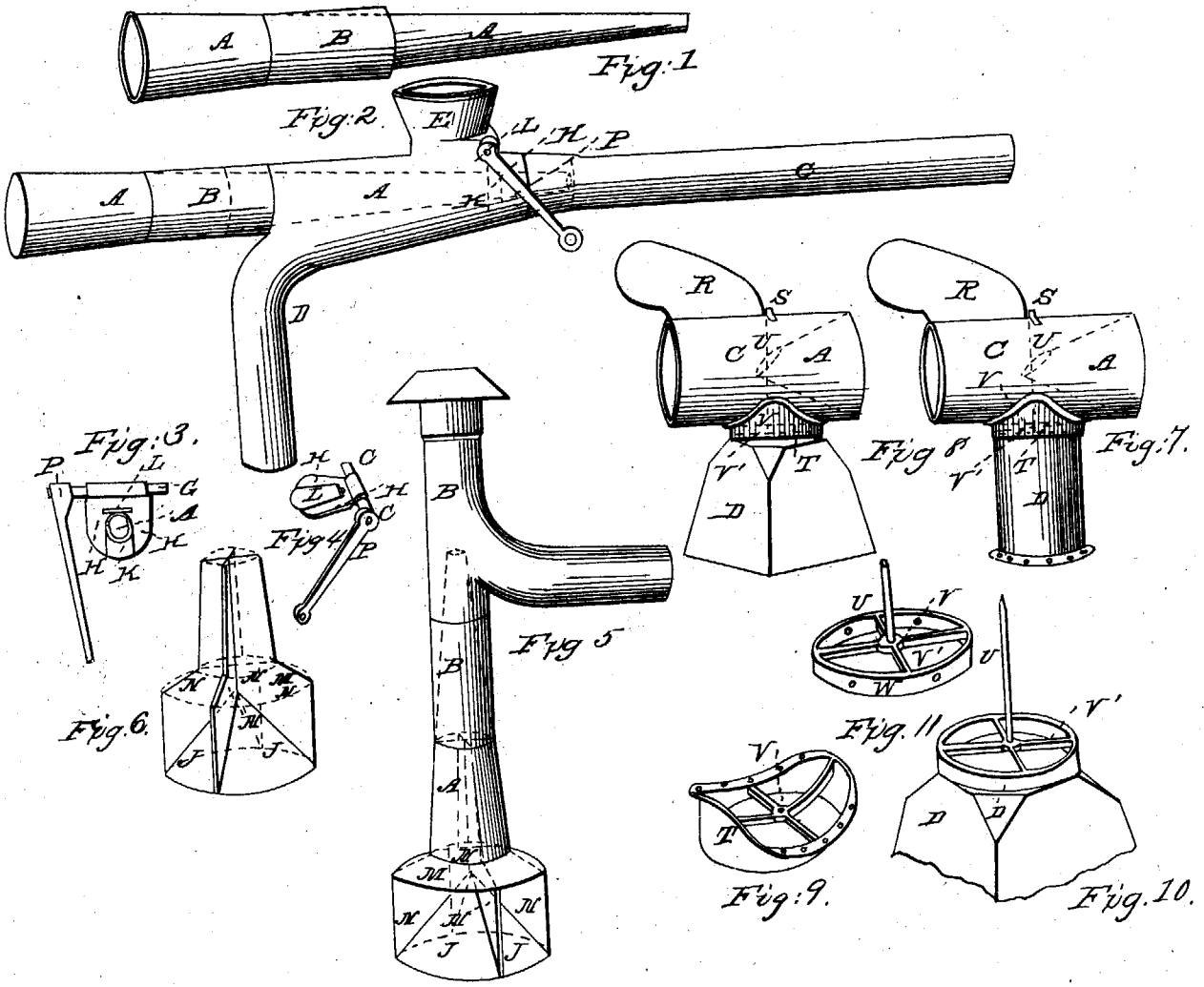
N. PETERS, Photo-Lithographer, Washington, D. C.

UNITED STATES PATENT OFFICE.

PETER C. GUION, OF CINCINNATI, OHIO.

IMPROVED COWL OR DRAFT-ACCELERATOR FOR STEAMERS.

Specification forming part of Letters Patent No. 16,010, dated November 4, 1856; Reissue No. 465, dated May 26, 1857.

*To all whom it may concern:*

Be it known that I, PETER C. GUION, of the city of Cincinnati, in the county of Hamilton and State of Ohio, have invented a new and useful improvement for the acceleration of draft for flues and chimnies of buildings, locomotive-engines, steamers, and for purposes of ventilation, of which the following is a specification.

The nature of my invention consists of a conical tube, A, Figure 1, with the forward end the largest, tapering to about one-fourth the diameter at the small end, which is inserted in a horizontal flue, C, Fig. 2, and above the perpendicular chimney or flue D, which is connected with the horizontal flue curving to the smaller end of the conical tube. When the locomotive or steamer is stationary, the smoke from the perpendicular flue passes around the conical tube and out of the opening above E. On the conical tube is fastened a jacket, B, Fig. 1, so that when the conical tube is inserted in the horizontal flue the jacket slips over the upper flue when the locomotive or steamer is in forward motion, thereby letting a draft of air pass directly through the tube, and through the flue over the locomotive and cars, or over the steamer to the stern of the vessel. This circulation of air, as it passes out of the smaller end of the conical tube in the horizontal flue, produces a suction and strong draft in the lower upright chimney, which accelerates the draft, thereby causing the fuel to burn briskly, and insures a strong and steady draft through the furnace, generating more steam with a given quantity of fuel, and consuming most of the smoke. The valves, Figs. 3 and 4, are fastened to the arm G, connected with a lever, P, which moves the valve in position. The main valve H has a slot to pass over the conical tube, and on the slot is a small valve, L, which, when the main valve H is raised up, falls over the slot and is raised with the main valve in shutting the upper opening. There is a support, K, to secure the small end of conical tube in place, and when the main valve H is let down it falls over and around the conical tube and support K, thereby opening the upper mouth or top of chimney and closing the horizontal tube, letting the smoke pass upward when the locomotive is stationary or moving backward.

Fig. 5 is a vertical position of conical tube A, with cross-partitions N extending in the large end and about one-third the length of tube A. The partitions form separate air-ducts, which open into the conical tube A at the termination of the partition N. The base or cone J is fastened to the roof of the boat or house. On the sides of the cone J are fastened the partition N, extending up and fastened to flange M, which form the opening for receiving air from any direction. Flange M is a flat rim lying in the partition N and fastened to conical tube A. The conical tube A is inserted into the upright chimney at the stern of the boat. This application of the accelerator in a vertical position at the after part of the chimney secures a strong draft when the wind is blowing in the same direction the boat is running, and adds additional draft when the wind is blowing in any other direction by receiving air in both the horizontal and vertical accelerators at the same time.

Fig. 6 represents cone J with the partitions on, with the conical tube off.

Figs. 7 and 8 represent the accelerator as applied to a chimney or for the purpose of ventilation. The conical tube A is inserted in the horizontal flue C, upon the under side of which is fastened a collar, T, with cross-bars V, and hole in the center for upright rod U to pass through and into center S, which is fastened into the upper side of flue C, which allows the flue C to revolve upon its center and over flue D. Vane R is fastened upon flue C, on the opposite end from cone A. The action of the wind upon vane R causes the flue C to revolve upon the center S and always present the large end of conical tube A to the wind, thereby causing a strong draft or suction up the chimney or flue D. The base or upright flue D, which is fastened upon the chimney or roof, has bars across the top, in the center of which is fastened the upright rod U, upon which flue C revolves. Fig. 10 shows the base with cross bars V and upright rod U in the center.

Fig. 9 represents the collar T, with cross-bars V and hole in the center for upright rod U to pass through; also a flange with holes in to fasten to flue C.

Fig. 11 is a ring, W, with cross-bars V and upright rod U in the center, which is fastened into base or flue D, as applied for the purpose of ventilation.

Flue D, Fig. 7, has a flange at the bottom, with holes to fasten it to roof of a house, boat, or car.

I do not claim any of the several devices, surfaces, or parts described, separately; but I do claim their combination constructively, in the manner and for the purposes hereinbefore described and shown.

PETER C. GUION.

Witnesses:
RICHARD HILL,
WM. B. BARRY.